April 29, 1924.  R. B. BENJAMIN  1,492,014

FIXTURE CHAIN

Filed June 7, 1919

Inventor:
Reuben B. Benjamin
By Jones, Addington, Ames & Seibold, Attorneys.

Patented Apr. 29, 1924.

1,492,014

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

FIXTURE CHAIN.

Application filed June 7, 1919. Serial No. 302,407.

*To all whom it may concern:*

Be it known that I, REUBEN B. BENJAMIN, a citizen of the United States, residing at Chicago, in the county of Cook and State of Illinois, have invented new and useful Improvements in Fixture Chains, of which the following is a full, clear, concise, and exact description, reference being had to the accompanying drawing, forming a part of this specification.

The present invention relates to fixture chains and connections of the type wherein the chains are made up of separable links which may be strung together or disconnected to vary the length of the chain and in which electric conductors are threaded through the links of the chain to provide the electric circuit.

One object of the present invention is to provide a chain in which the conductors will be more fully hidden from view than heretofore.

Another object is to construct the chain so as to prevent possible injury to the insulation of the conductors by reason of rough or sharp edges formed on the links during manufacture.

Other objects are to provide a chain which will be sightly and strong and at the same time cheap to manufacture.

In carrying out my invention I preferably construct the links of uniform thickness, with outer concave and inner convex surfaces. A transverse opening in each link allows the links to be readily assembled. This assembly is facilitated by providing a wide entrance to the opening through which the links pass. The shape of the opening is such as not to materially interfere with the strength of the chain when the links are assembled. I also give those portions of the links which engage each other a greater projected width by reducing the degree of curvature at the link-engaging points relative to other points in the link. This greater width provides ample space for the conductors which cross each other as they pass through alternate links and are therefore inclined as they pass over the outer surfaces of the intermediate links. The increased width prevents the insulation of the conductors from being injured by the abrasive action of sharp or rough edges upon the links in case the parts are moved as would often be the case where the fixture is allowed to swing. The various features and advantages of the invention will be more fully understood upon reference to the following detailed description taken in connection with the accompanying drawing while the scope of the invention will be particularly pointed out in the appended claims.

In said drawing, Fig. 1 is an elevation of a chain and conductors constructed and arranged according to the present invention, a portion of one of the links being shown in section;

Figure 1:
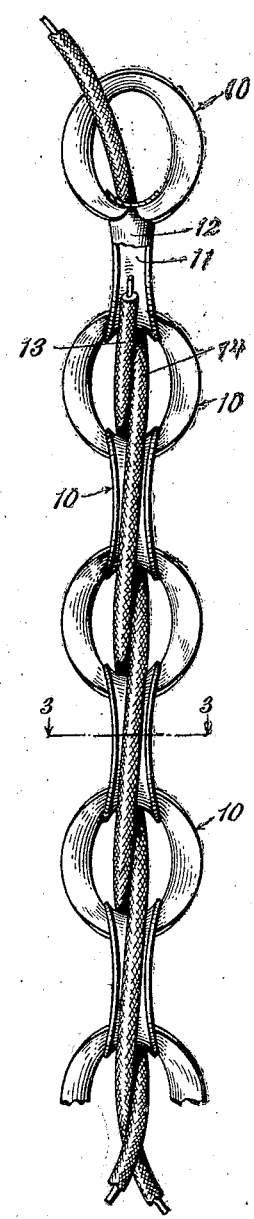
Figure 2:
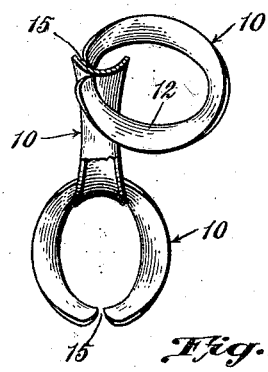
Fig. 2 is a similar view of three links illustrating the manner of assembling the links.
Figure 3:
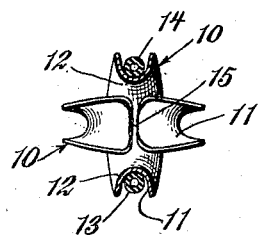
Fig. 3 is a transverse section taken on a plane indicated by the line 3—3 of Fig. 1, and showing the adjacent link in elevation. Throughout these views like characters refer to like parts.

In the particular embodiment of the invention herein shown, each link 10 is made by shaping a metal blank into the form illustrated. Each link 10 is continuously curved in the plane of the link, that is, each link is provided with an outer concave surface 11, and an inner convex surface 12. The degree of curvature at a point midway between adjacent links is a maximum. The degree of curvature at the points where the links engage each other is a minimum. The curvature between these two points is gradually varied from the minimum to the maximum, as clearly illustrated. In this particular instance, the blanks out of which the links are formed are of uniform width throughout and consequently the change of the degree of curvature in the manner pointed out, makes the link-engaging portions of each link broader in projection than the intermediate portions. This will be clear from an inspection of Fig. 1 of the drawing wherein the second, fourth, sixth, and eighth links from the top are viewed in the plane of the links. As there shown the projected width of each link at its center is less than the projected width at its ends. The curvatures of the link-engaging portions of each link are such as to cause these portions to fit together snugly and over an extended surface so that a good bearing is provided between the links when assembled. As clearly shown more particularly in the case of the first and second links of Fig. 1, this close fit is brought about by having the transverse curvature the same as the curvature in the plane of the link.

It will also be seen that by varying the curvature of the inner and outer surfaces of the link in the manner pointed out, an increased width is provided for the passage of the insulated conductors 13 and 14. These conductors are passed through every other link and in their passage through those links they cross each other. In view of this crossing of the conductors in every other link, they are inclined to the axis of the chain as they approach and recede from the crossing points, and consequently require more space as will be apparent from a consideration of the drawing. As the conductors 13 and 14 pass from one crossing point to another they pass around the outer surfaces of the intermediate links. Due to the curvature of these links the conductors are quite largely hidden from view. They are most conspicuous, of course, at the points where they cross each other. The increased space for the conductors in their passage around the outside of the links prevents their coming in contact with the edges of the link and consequently protects them against abrasion in case such edges should be sharp or rough as might be the case where the links are manufactured in large quantities. The punching and shaping operations might result in leaving some such edges.

For the purpose of assembling the links, I preferably provide each link with an opening 15. This opening at its narrowest point is slightly wider than the thickness of the link and consequently each link may be readily passed through the opening of its neighbor. The assembly of the links is facilitated by having the opening 15 widest at its ends, and narrowest at some intermediate point. By gradually tapering the walls of the opening 15 from this wide entrance to the narrow point, the opening may be readily found when attempting to slip a link through it. By reason of the close approach of the walls of the opening 15 and by reason of the considerable width of the link at that point, ample bearing surface is provided at the open point of the link without materially decreasing the strength of the link or the strength of the chain in which it is located. The construction of the opening also prevents any possible separation of the chain links when once assembled.

The close and snug engagement of the links with each other over such an extended area as is provided by the partial flattening of the link-engaging portions of each link, tends to make the chain more rigid and less likely to swing than would be the case were the engaged surface less extensive. The flaring or partially flattening of the links at their ends also gives the chain a better appearance than would be the case were the opposite sides of the link parallel. Another point of advantage in this construction is that the links do not have to be sprung or separated to assemble them. The opening 15 is ample at all times to pass any of the links.

In carrying out my invention, it will be clear that some changes and alterations may be made in the details of the structure illustrated and described without departing from the spirit and scope of the invention. It will also be apparent that a chain could be assembled if every other link 10 were continuous and not provided with the opening 15. I therefore do not wish to be limited to the exact structure illustrated and described but aim to cover all alterations and modifications which come within the spirit of the invention, by the terms of the appended claims.

What I claim as new and desire to secure by Letters Patent of the United States, is:

1. A fixture chain comprising interlocking links of sheet material, each link comprising a ring-shaped member formed of a strip having a continuously curved transverse cross-section, the radius of such transverse cross-sectional curvature being smallest intermediate the points of engagement of the link with adjoining links and gradually increasing toward said points of engagement between the links.

2. A fixture chain comprising interlocking links of sheet material, each link comprising a ring-shaped member formed of a strip having a continuously curved transverse cross-section, the radius of such transverse cross-sectional curvature of each side of each link being smallest at the central portion thereof and gradually increasing toward the ends thereof.

3. A fixture chain of interlocking links formed of sheet material of uniform width throughout, each link comprising a ring-shaped member formed of a strip having a continuously curved transverse cross-section, the radius of such transverse cross-sectional curvature of each side of each link being smallest at the central portion thereof and gradually increasing toward the ends thereof.

4. A fixture chain of interlocking links formed of sheet material of uniform width throughout, each link comprising a ring-shaped member formed of a strip having a continuously curved transverse cross-section, the radius of such transverse cross-sectional curvature of each side of each link being smallest at the central portion thereof and gradually increasing toward the ends thereof, the link-engaging surfaces closely contacting with each other throughout a relatively wide area.

5. A chain formed of sheet metal links, one link being of curved form, said curved link comprising a ring-shaped member formed with a substantially continuously curved transverse cross-section, and the adjacent link being an open link and having an opening through which the curved link may be inserted edgewise for assembling without springing the open link, the width of the opening at its narrowest point being substantially the same as the thickness of the metal of said curved link, the edge of one end of said open link being shaped to conform to the shape of the curved link as the latter is inserted edgewise through the opening to enable the links to be assembled without springing the open link.

6. In an interlocking link fixture chain, a link which comprises a ring-shaped member formed with a substantially continuously concave curved outer edge having a radius of concave curvature smallest intermediate the points of engagement thereof with adjoining links and gradually increasing toward said points of engagement between the links.

7. In an interlocking link fixture chain, a link which comprises a ring-shaped member formed with a substantially continuously concave curved outer edge having a radius of concave curvature smallest intermediate the points of engagement thereof with adjoining links and gradually increasing toward said points of engagement between the links, said ring-shaped member being also internally formed with inwardly convex curved surfaces at said points of engagement.

8. In an interlocking link fixture chain, a link which comprises a substantially elliptical shaped member formed also with a substantially continuously concave curved outer edge having a radius of concave curvature smallest intermediate the points of engagement thereof with adjoining links and gradually increasing toward said points of engagement between the links.

In witness whereof, I have hereunto subscribed my name.

REUBEN B. BENJAMIN.